United States Patent

[11] 3,545,459

| [72] | Inventor | James P. Phillips<br>Marshalltown, Iowa |
|---|---|---|
| [21] | Appl. No. | 523,471 |
| [22] | Filed | Jan. 27, 1966 |
| [45] | Patented | Dec. 8, 1970 |
| [73] | Assignee | Jet Cit Thru, Inc.<br>Marshalltown, Iowa<br>a corporation of Iowa. by direct and mesne assignments |

[54] VEHICLE WASHING APPARATUS
14 Claims, 8 Drawing Figs.

[52] U.S. Cl. .................................................. 134/123,
134/181. 239/186
[51] Int. Cl. .................................................. B60s 3/04
[50] Field of Search .................................................. 134/45,
123. 180. 181: 15/CCP(Digest); 239/184 — 187

[56] References Cited
UNITED STATES PATENTS

| 2,558,472 | 6/1951 | Wilcox | 134/123X |
| 2,676,600 | 4/1954 | Vani et al. | 134/123 |
| 2,703,579 | 3/1955 | Merancy et al. | 134/123X |
| 2,708,446 | 5/1955 | Phillips | 134/123X |
| 3,038,481 | 6/1962 | Brechtel | 134/123X |
| 3,339,563 | 9/1967 | Ordonez | 134/123X |
| 3,339,565 | 9/1967 | Williams | 134/123X |

FOREIGN PATENTS

| 1,390,524 | 1/1965 | France | 15/(CCP)UX |
| 961,509 | 3/1957 | Germany | 134/123 |
| 375,182 | 6/1932 | Great Britain | 134/123 |

*Primary Examiner*—Robert L. Bleutge
*Attorney*—Dick, Zarley, McKee & Thomte

ABSTRACT: Vehicle washing apparatus including a pair of parallel arcuate standards positioned on opposite sides of a vehicle washing station. A U-shaped spray wand is mounted between the two standards and adapted for movement in an arcuate path thereover.

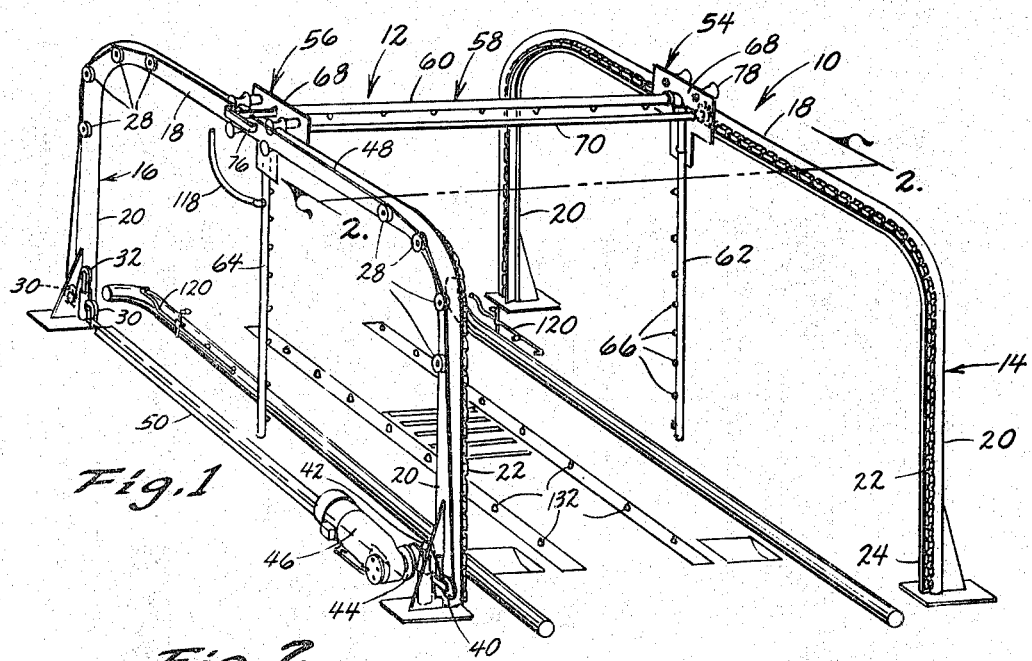
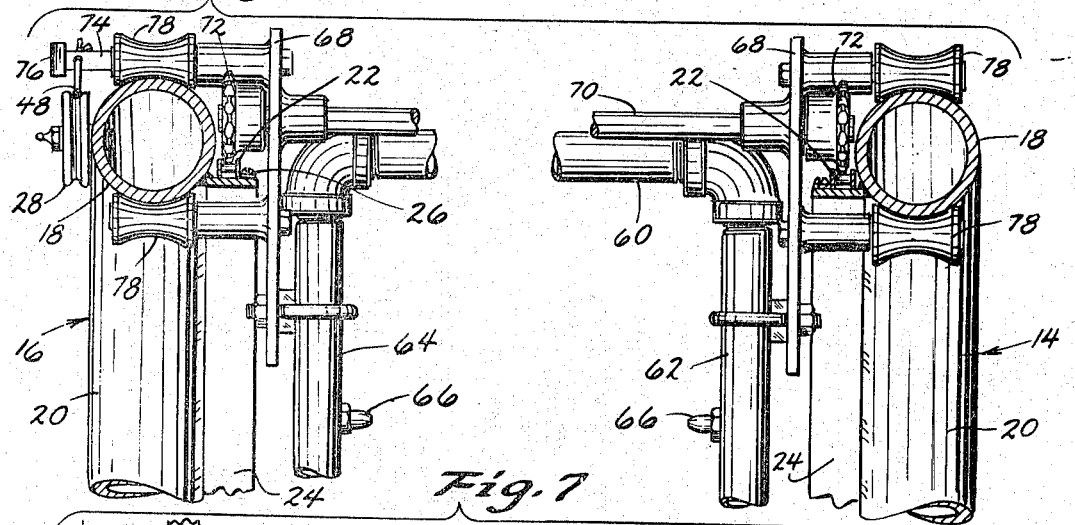
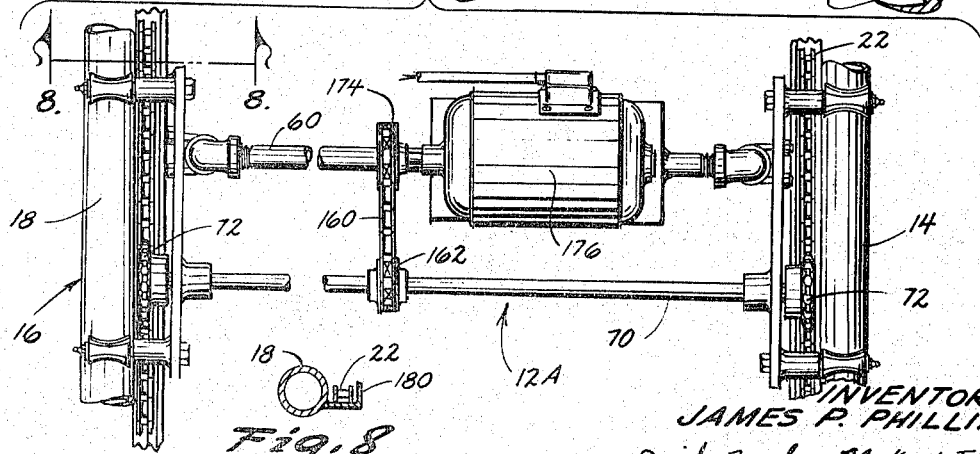
INVENTOR
JAMES P. PHILLIPS
BY Dick, Zarley, McKee & Thomte
ATTORNEYS

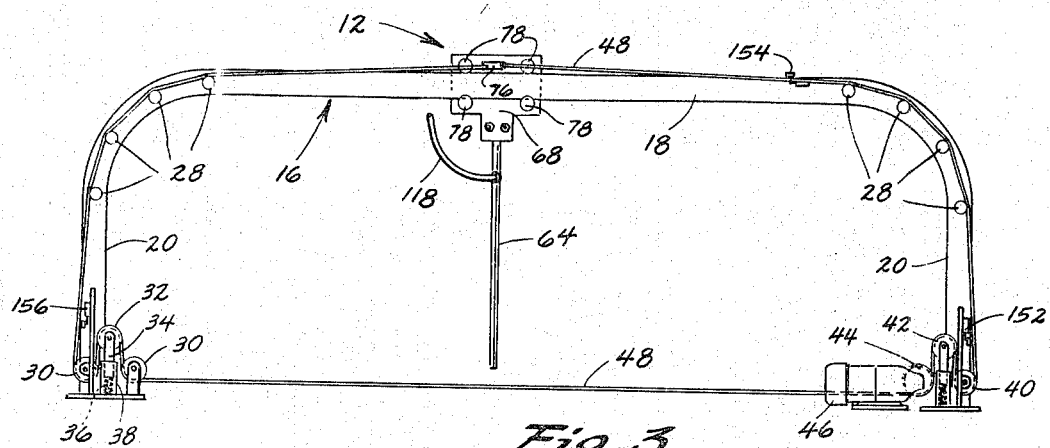
Fig. 3
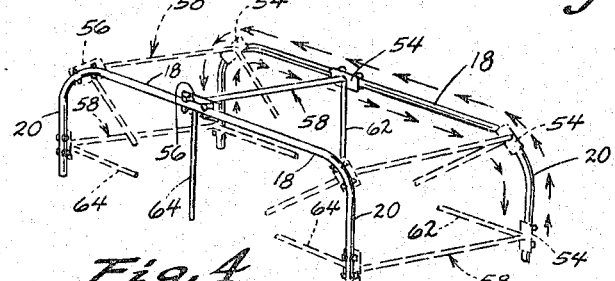
Fig. 4
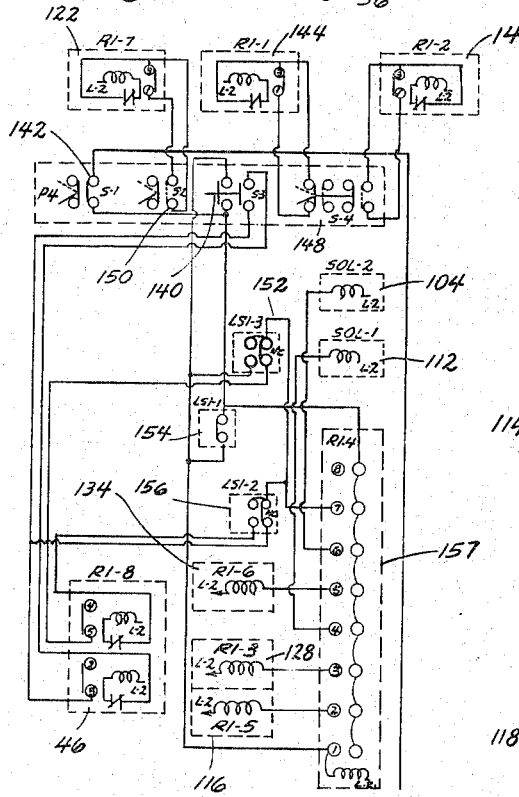
Fig. 6
Fig. 5
INVENTOR
JAMES P. PHILLIPS
BY Dick, Zarley, McKee & Thomte
ATTORNEYS

VEHICLE WASHING APPARATUS

This invention relates to a vehicle washing apparatus and in particular to a vehicle washing apparatus which permits the vehicle to remain stationary during the entire washing operation.

The vehicle washing apparatus includes a pair of standards on opposite sides of the vehicle washing station for movably supporting the wand carriage which is adapted to move the full length of the standards. The standards are provided at their opposite ends with vertical portions. The wand carriage is generally U-shaped which is adapted to move back and forth over the car from a position in a horizontal plane corresponding to the front bumper of the car to a rear position in a plane corresponding to the rear bumper of the car. While the wand carriage is moving along the length of the car, the U-shaped wand is in a vertical position. An undercarriage spray system which uses reclaimed water is provided for washing the underside of the car. Additionally, a pair of wheel wash units are provided for loosening the dirt on the wheels before the wand comes along to clean them.

It is one of the principal objects of this invention to provide a car wash apparatus having a wand which travels back and forth over the car and will wash the quarter-panels twelve times and the front and rear ends eight times. By the very unique rail support standards provided for the wand carriage, the washing apparatus is given the capability of passing over the hard to clean areas of the car a greater number of times. This is accomplished by the fact that the support standards have horizontal top portions and vertical end portions and the wand carriage follows the curvature of the support standards and thereby washes the quarter panels when the wand carriage is in a vertical plane as well as when it moves to the horizontal plane as it follows the curvature of the rail support stands standards on opposite sides of the vehicle.

A further object of this invention is to provide a vehicle washing apparatus which is simple in design, economical to manufacture and refined in appearance.

These and other objects will be apparent to those skilled the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the car wash apparatus;

FIG. 2 is an elevational fragmentary cross-sectional view taken along line 2-2 in FIG. 1 showing in particular the carriage mountings on the rail support standards and the power means for moving the carriage assembly;

FIG. 3 is a side elevational view of the vehicle wash apparatus of FIG. 1;

FIG. 4 is a reduced in scale perspective view similar to FIG. 1 illustrating in particular the various positions of the carriage assembly as it travels back and forth along the length of the rail support standards;

FIG. 5 is a plumbing schematic for the washing apparatus;

FIG. 6 is an electrical schematic for the washing apparatus;

FIG. 7 is a top plan fragmentary view of a modified embodiment of the carriage assembly; and FIG. 8 is a cross-sectional view taken along line 8-8 in FIG. 7 and showing in particular the track for the sprocket chain.

The vehicle wash apparatus of this invention is referred to generally in FIG. 1 by the reference numeral 10 and includes a wand carriage assembly 12 movably mounted on a pair of spaced apart support standards 14 and 16.

The support standards 14 and 16 are similar to the extent that they each include horizontal portions 18 and vertical end portions 20 which are secured to a support surface. The support standards 14 and 16 are preferably formed from circular-in-cross-section material as seen in FIG. 2. The support standards should have an effective length slightly greater than the vehicle being washed. The standards are spaced apart a distance sufficient to comfortably drive an automobile therebetween.

Along the inside length of the support standards a sprocket chain 22 is secured and held in place by a flange plate 24. Anchor screws 26 are spaced along the length of the chain 22 for securing it to the flange plate 24.

On the outside of the standard 18 are cable pulleys 28 at the corners between the horizontal portions 18 and the vertical portions 20. At the front end of the vehicle wash apparatus a pair of pulleys 30 are provided in a common plane and a third pulley 32 is positioned above and therebetween. The pulleys 30 are stationary while the pulley 32 is mounted on a post 34 biased upwardly by a spring 36 in a sleeve 38 as seen in FIG. 3. At the rear or exit end of the vehicle wash apparatus is a fixed pulley 40 which is next to an upwardly biased tightener pulley 42 positioned between a pulley 44 on a motor 46 and the pulley 40. A length of cable 48 is provided which has its ends secured to the carriage 12. The cable extends along the rail support standard 16 over the guide pulleys 28, under the outer pulleys 30 and 40 at opposite ends of the support standard 28 and thence over the tightener pulleys 32 and 42. Next the cable extends around the motor pulley 44 such that it extends in opposite directions from the bottom side of the pulley. From the motor pulley 44 the cable extends the full length of the support standard 16 under a floor channel 50. Thus it is seen that as the motor is rotated in one direction, the cable will be let out on one side and pulled in on the opposite side and when the motor is rotated in the opposite direction the operation will be in reverse. Consequently, the wand carriage 12 will be moved back and forth along the length of the support standards 14 and 16.

The wand carriage assembly 12 is provided with a pair of trolleys 54 and 56 at opposite ends thereof for supporting engagement with the support standard rails 14 and 16. The wand carriage assembly also includes a generally U-shaped wand 58 having a horizontal transversely extending portion 60 with perpendicular end portions 62 and 64. A plurality of spray jet nozzles 66 are provided along the length of the wand sections 60, 62 and 64. The trolleys 54 and 56 include frame plates 68 to which the wand 58 is secured at its corners. Additionally, a drive shaft 70 extends between the trolley frame plate 68 and is provided with a sprocket wheel 72 at each end for engagement with the sprocket chains 22. Since the sprocket chains 22 are relatively immovable longitudinally, the ends of the carriage assembly 12 are maintained in alignment at all times during their movement along the rails 14 and 16.

A cable anchor arm 74 is secured to the outer side of the trolley plate 68 adjacent the rail 16 for securing the ends of the cable 48 to the carriage 12. A shoe plate element 76 is horizontally disposed on the outer end of the cable anchor arm 74 as seen in FIGS. 1 and 2.

The trolleys 54 and 56 follow the curvature of the rails 14 and 16 since four rollers 78 are provided, two on top and two on the bottom at opposite ends of the trolley frame plates 68. The rollers 78 have a concave outer surface for mating engagement with the convex outer surface of the circular-in-cross-section rails 14 and 16. As seen in FIGS. 1, 2 and 3, the top rollers 78 engage the top or outer sides of the rails 14 and 16 while the lower rollers 78 engage the opposite, inner or bottom sides of the rails.

Thus it is seen that in operation the motor 46 will move the carriage assembly 12 back and forth the full length of the rails 14 and 16 permitting the wand 58 to assume the various positions shown in FIG. 4. The extreme positions are when the end wand portions 62 and 64 are in vertical positions as the trolleys engage the horizontal rail portions 18 and then when the end or side wand portions 62 and 64 are in horizontal positions when the trolleys 54 and 56 are in engagement with the vertical rail portions 20.

The plumbing circuitry for supplying the washing solution is illustrated in FIG. 5. A source of water (not shown) is supplied through a pipe 82 which connects to a T 84. A line 86 extends from the T 84 to a water heater 88 while another line 90 bypasses the water heater 88 and feeds a soap tank 92. It is apparent that the line 90 supplies cold water and a line 94 extending from the water heater 88 provides hot water. A second cold water line 96 and the hot water line 94 are in communication with each other at a mixing valve 98. From the mixing valve 98 a line 100 extends to a pressure regulator 102. A pipe 104 is connected to a soap injection pump line 106. A solenoid valve 108 is disposed in the line 102 on the output side of the soap injection line 106. The cold water line 96 also has a branch 110 having a solenoid valve 112 for closing the line to communication with an outlet pipe 114 which is also in communication with the line 104. Solenoid valves 108 and 112 determine whether cold water and/or soap solution will be supplied to the outlet pipe 114. A high-pressure spray pump 116 is provided for supplying the liquid solution to a conduit 118 connected to the end wand portion 64 as seen in FIGS. 1 and 3. Preferably, the pressure at the nozzles 66 is 600 p.s.i. In the inlet water line 82 the water pressure will typically be between 60 and 75 p.s.i. and will be reduced to 15 p.s.i. after passing through the pressure regulator 102. The soap injection pump provides a 25 p.s.i. pressure and thereby the desired washing mixture is provided to the high-pressure pump 116. A preferable temperature for the mixing valve has been 130° F. Thus it is seen that when the solenoid valve 112 is closed and the valve 104 is open, the soap solution is supplied to the wand 58 while when the solenoid 104 is closed then the valve 112 is opened rinse water is sprayed from the jet 66 carried on the wand 58.

Additionally, wheel wash wand members 120 are provided at the front end of the washing apparatus and receive a straight solution of soap through a pump 122 in communication with the soap tank 92 as seen in FIG. 5. Four nozzles 124 are provided on the wheel wands 120.

Moreover, a pit 126 is provided beneath the floor of the car wash facility and collects the wash water which is then used to wash the underside of the vehicle. A pump 128 is provided which supplies the reclaimed water through pipes 130 to a plurality of floor nozzles 132 as seen in FIG. 1.

A soap injector pump 134 connected to the soap line 106 is rated at three-quarters horsepower. The underspray pump 128 has a 5-horsepower motor while the high-pressure overspray pump 116 has a 15-horsepower motor. The reversible motor 46 for operating the carriage 12 is rated at three-quarters horsepower while the underspray pump motor 122 has a 5-horsepower rating.

As seen in the electrical schematic drawing of FIG. 6, a starting switch 140 is provided which energizes the carriage motor 46, the soap injector motor 134 and the high-pressure overspray pump 116. A master control switch 142 is provided which will stop all operations and is referred to as a "panic" button. A pair of drying fan motors 144 and 146 are operated by a switch 148. The wheel spray motor 122 is operated by a switch 150.

As seen in FIGS. 3 and 6 for example, three limit switches 152, 154 and 156 are provided on the rail standard 16 and are actuated by the shoe plate element 76 carried on the trolley plate 68. As the carriage 12 moves back and forth through its wash and rinse cycles the limit switches are actuated and in turn operate a stepping relay unit 157. First, upon actuation of the start switch 140 the carriage 12 moves to the right from its position in FIG. 3 to the lowest right end dash line position of FIG. 4 whereupon the limit switch 152 is actuated causing the motor 46 to be reversed thereby moving the carriage 12 to the left to its lowermost position at the left or front end in FIG. 4. Again, the motor is reversed by the shoe 76 actuating the limit switch 154 and the carriage returns to the right end until it engages the limit switch 152 at which time the undercar spray pump motor 122 is shut off, the soap injector pump motor 134 is stopped and the rinse water solenoid 112 is actuated while the soap solenoid 102 is closed. The carriage 12 then goes again through the same cycle, first to the lowermost right-hand position and then back to the front end lowermost position (the left end of FIG. 3) and then back to the lowermost right end position and finally back to the start position adjacent the limit switch 152. It is thus seen that the wand 70 travels back and forth over a car washing its quarter-panels 12 times and its front and rear ends eight times. The wheel wash motor 128 may be operated manually as desired but is preferably operated prior to washing by the wand 58 as the high concentrate soap solution from the wheel wash wands 120 will loosen the dirt on the wheels substantially to be finally removed by the end wand portions 62 and 64.

An alternate embodiment of the carriage is shown in FIGS. 7 and 8 and referred to generally by the reference numeral 12A. The difference lies in the elimination of the cable 48 and all of its related components. Instead, the drive shaft 70 is directly rotated by a sprocket chain 160 interconnecting a sprocket 162 on the shaft 70 and a sprocket 174 on a motor 176 mounted on the horizontal wand portion 60. The motor 176 operates in the same manner as the motor 46. Additionally, as seen in FIG. 8, the sprocket chain 22 is loosely mounted on an L-shaped flange 180 to permit lateral movement of the chain to compensate for any wear or maladjustment of the sprocket gear 72.

Some changes may be made in the construction and arrangement of my VEHICLE WASHING APPARATUS without departing from the real spirit and purpose of my invention, and it is my intention to cover by my claims, any modified forms of structure or use of mechanical equivalents which may be reasonably included within their scope.

I claim:

1. A vehicle washing apparatus, comprising a pair of spaced-apart elongated support standards, each of said support standards including a horizontal portion and opposite vertical end portions engaging a supporting surface, a vehicle washing station provided between said standards, a wand carriage assembly extending between and movable on said support standards, said wand carriage including a horizontally disposed wand portion extending transversely of the length of said support standards, and between said support standards, and perpendicular opposite side wand portions extending on the longitudinal sides of said washing station, a plurality of outlet ports on said horizontal and opposite side wand portions in spaced-apart relationship and directed inwardly towards said washing station, a source of washing cleaner in communication with said outlet ports on said wand carriage, said wand carriage including means for maintaining said wand portions in a perpendicular relationship to the longitudinal axis of said support standards along the entire length of travel along the horizontal and vertical end portions and means for moving said wand carriage back and forth along substantially the full length of said horizontal and opposite vertical end support portions whereby said horizontal and side wand portions move as a unit and said side portions are disposed in a vertical plane when said wand carriage is positioned on said horizontal portions of said supporting standards and in a horizontal plane when positioned on said vertical portions of said supporting standards.

2. The structure of claim 1 wherein said means for maintaining said wand portions in a perpendicular relationship to the longitudinal axis of said support standards along the entire length thereof includes a trolley on each support standard and each support standard defines a continuous rail between the support surface ends of said oppositely disposed vertical support portions, said horizontal and side wand portions form a unit and said unit is connected at opposite sides to said trolleys.

3. The structure of claim 2 wherein said rails are arcuate in cross section and each of said trolleys is provided with a plurality of longitudinally spaced-apart rollers for mating engagement with said rails.

4. The structure of claim 3 wherein said rollers have concave outer surfaces for mating engagement with said rails.

5. The structure of claim 4 wherein said plurality of rollers on each roller includes two pairs of rollers at opposite ends of said trolley and one roller of each pair being on the opposite side of said rail of the other roller in each pair.

6. The structure of claim 1 wherein said means for moving said wand carriage includes a shaft connected to and movable with said carriage extending transversely of the length of said support standards and having a sprocket fixedly secured at each end thereof, a sprocket chain secured to and extending the length of each of said support standards, said sprockets engaging said sprocket chains and motor means operatively connected to said wand carriage whereby said wand carriage is maintained in alignment with said support standards as it moves the length thereof.

7. The structure of claim 6 wherein said motor is mounted on and moves with said wand carriage and is coupled to said shaft.

8. The structure of claim 6 and a cable has its opposite ends secured to one end of said wand carriage, said cable extending closely adjacent to the adjacent support standard along its substantial length, said cable being continuous and extending beneath the horizontal portion of said adjacent support standard and along the support surface, and a motor having a drive pulley, said cable being wrapped around said pulley to extend in opposite directions whereby upon said motor rotating in one direction said wand carriage will move in one direction and upon said motor rotating in the opposite direction said wand carriage will move in the opposite direction.

9. The structure of claim 6 wherein anchor means is provided to substantially hold said sprocket chain rigid against longitudinal and lateral movement.

10. The structure of claim 9 wherein an elongated channel is provided for said sprocket chain and said channel has sufficient width to permit limited transverse lateral movement of said sprocket chain.

11. The structure of claim 6 and means is provided for reversing the direction of rotation of said motor and thereby reversing the direction of movement of said wand carriage when said carriage has reached the bottom end of said vertical support portions at either end of said support standards.

12. The structure of claim 11 wherein said washing cleaner includes a supply of soap solution and a supply of rinse water, means for selectively alternating the supply between said soap solution and said rinse solution for communication with said outlet ports on said wand carriage.

13. The structure of claim 12 wherein said outlet ports are spaced apart along the length of said horizontal and end wand portions and are directed inwardly towards said washing station and said end wand portions are substantially as long as the maximum height of said support standards.

14. A vehicle washing apparatus, comprising:
a pair of spaced-apart elongated support standards, a vehicle-washing station provided between said standards, a wand carriage assembly extending between and movable on said support standards, means for moving said wand carriage back and forth along said support standards and over said washing station, a plurality of outlet ports on said wand carriage in spaced-apart relationship, source of washing cleaner in communication with said outlet ports on said wand carriage; each of said pair of support standards including a horizontal portion and vertical end portions, said end portions engaging a supporting surface, said wand carriage being adapted to move substantially the full length of said support standards along said horizontal and vertical portions;

said wand carriage including a horizontally disposed wand portion extending transversely of the length of said support standards and end wand portions extending perpendicularly to said horizontal portion and towards said washing station, means for maintaining said horizontal and end wand portions in a constant angular relationship to the longitudinal axis of said pair of supports at all positions in moving back and forth along the length of said pair of supports;

said means for moving said wand carriage includes a shaft extending transversely of the length of said support standards and having a sprocket at each end thereof, a sprocket chain secured to and extending the length of each of said support standards, and motor means for rotating said shaft; and a cable has its opposite ends secured to one end of said wand carriage, said cable extending closely adjacent to the adjacent support standard along its substantial length, said cable being continuous and extending beneath the horizontal portion of said adjacent support standard, and a motor having a drive pulley, said cable being wrapped around said pulley to extend in opposite directions whereby upon said motor rotating in one direction said wand carriage will move in one direction and upon said motor rotating in the opposite direction said wand carriage will move in the opposite direction.